Feb. 14, 1956  A. E. FISHER  2,734,332
GRAIN PICK UP ATTACHMENT FOR HARVESTERS
Filed Jan. 5, 1953  2 Sheets-Sheet 1
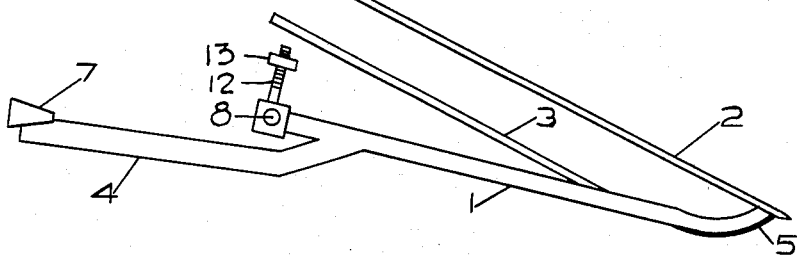
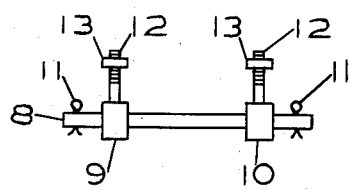
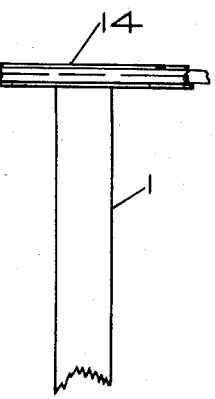
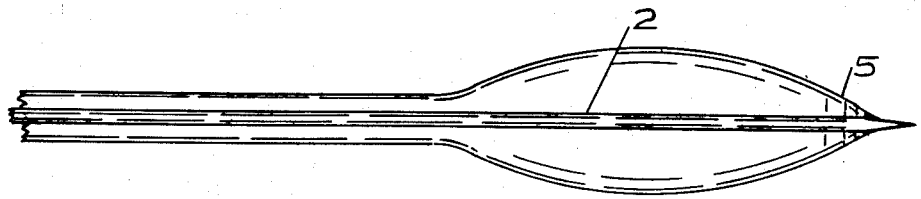
Inventor
Anton Edward Fisher
Per L. J. Mitchell
Attorney Feb. 14, 1956　　　A. E. FISHER　　　2,734,332
GRAIN PICK UP ATTACHMENT FOR HARVESTERS
Filed Jan. 5, 1953　　　2 Sheets-Sheet 2
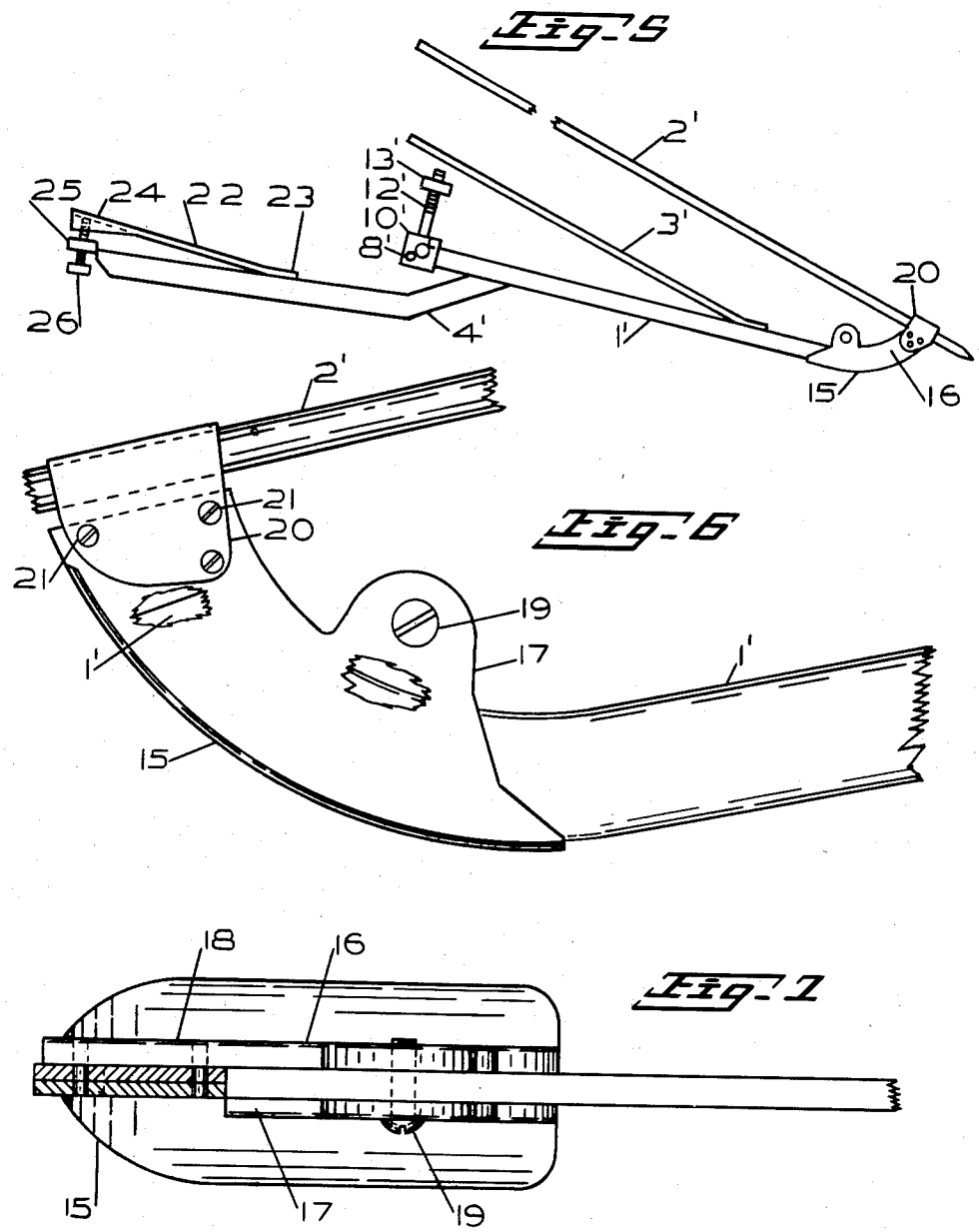
Inventor
Anton Edward Fisher
Per L. S. Mitchell
Attorney

United States Patent Office 2,734,332
Patented Feb. 14, 1956

2,734,332

GRAIN PICK UP ATTACHMENT FOR HARVESTERS

Anton Edward Fisher, Calgary, Alberta, Canada

Application January 5, 1953, Serial No. 329,575

2 Claims. (Cl. 56—312)

My invention relates to grain pick up attachments for harvesters, having reference to a device to be carried on the front of the harvester cutting bar to raise flattened or heavy grain.

In the art to which the invention relates a pick up for grain harvesters more usually includes a runner for travel on the ground in advance of the harvester, pivotally attached thereto, and includes a straw carrying finger on the runner, or two such, and a tail piece limiting elevation and depression of the runner.

The present invention contemplates improvements in devices of this kind. One of the great difficulties encountered in pick up attachments lies in the character of the grain to be harvested, in some cases this being heavy and flat and in others lighter or requiring very little assistance from the pick up for the cutting bar of the harvester to be able to cut the grain stalks at the desired height.

A further difficulty lies in the danger of the forward end of the runner digging into the ground and wrecking the pick up beside doing considerable damage to the harvester itself.

A still further difficulty lies in the necessity for adapting the attachment for use on different makes of harvester.

One of the objects of the invention is accordingly to provide an improved pick up attachment for grain harvesters having a runner with improved shoe portion at the forward end adapted for travel over soft ground without digging in, particularly where the ground is loose, soft or rough.

A further object of the invention is to provide an adjustable combination of runner, shoe and upper straw carrying finger adapting the device to meet various conditions to be encountered in harvesting.

A still further object of the invention is to provide an improved device for pivotally attaching the runner of the pick up to the harvester and in particular one adapted for convenient attachment of the device to different makes of harvesters.

A still further object of the invention is to provide an improved tail piece adapted to bear against the under side of the harvester platform without injury to the platform, and in addition to provide an adjustable attachment for the tail piece by which the angle to which the forward end of the runner may depress into the ground may be varied.

Other features and advantages of the invention will become apparent by reference to the accompanying description taken in conjunction with the drawings wherein like characters of reference indicate like parts throughout the several views and wherein:

Fig. 1 is a side view of a pick up attachment of a non adjustable character and embodying my basic improvements.

Fig. 2 is a front view of a bolt assembly for pivotal attachment of the pick up runner to a harvester.

Fig. 3 shows a detail fragmentary plan view of the rear end of a runner.

Fig. 4 shows an enlarged plan view of a fragment of the forward end portion of the runner.

Fig. 5 shows a fragmentary side view of a pick up attachment in accordance with my invention and including the adjustable shoe and tail piece.

Fig. 6 shows an enlarged side elevational view with parts broken away of the runner shoe and straw carrying finger illustrated in Figure 5.

Fig. 7 shows a top plan view of the parts shown in Figure 6, but omitting the finger.

Having reference to the drawings, more particularly Figures 1 to 4 inclusive, there is shown a pick up attachment, generally of a conventional character, that is including a runner 1, upper and lower straw carrying fingers 2 and 3, and tail piece 4.

The runner includes a forward curved portion at 5 to the end of which the finger 2 is attached. For the curved portion to more effectively travel over soft ground without digging in I have this part of the runner commencing at a point rearwardly of the start of the upward curve of the runner and extending to the forward end of the runner formed considerably wider than the body of the runner with the greatest width intermediate thereof and graduated to the ends of the widened portion to provide a shoe for travelling over ground that is rough or soft.

The pick up is prevented from depressing too much at its forward end by a cap 7 on the rear end of the tail piece 4, the cap being adapted to bear against the under side of the harvester platform, and in as much as the platform is usually a comparatively thin body a cap of sufficient width and length is required that will avoid any possibility of puncturing the harvester platform. The cap must further have a slope on its upper side conforming to that of the under side of the platform.

The tail piece extends parallel with and lower than the runner. It has been found that having the tail piece about one inch lower than the runner is satisfactory, this arrangement of tail piece and runner being important for the proper working of the pick up.

For attachment of the pick up to a harvester there is provided an improved adaptor designed to facilitate attachment to any type of harvester. This adaptor consists of a shaft 8 on which the heads 9 and 10 of eye bolts 12 are freely mounted to slide or turn thereon and held by cotter pins 11. While these connecting bolts are designated as eye bolts, in the present showing they are made up of reemed nuts to which bolts are welded to provide the necessary shanks for attachment to the harvester. The runner 1 includes a tubular cross member 14 mounted on the rear end of the runner and in which the shaft 8 is receivable free to turn.

In harvesters of the character to which the pick up is to be attached a series of bolts are normally provided six inches apart across the entire width of the cutting bar, and in attachment of grain pick ups to the harvester such of these bolts as are necessary are replaced by the eye bolts of the pick up. On the shanks of the eye bolts 12 are spaced nuts 13 between which the cutting bar of the harvester is engaged.

In the showing in Figures 5 to 7 adjustable features have been added by which the pick up may be adapted to meet the conditions prevailing in the grain to be harvested.

In this modification the shoe is formed as a separate part of the runner and of a single piece of material providing a curved shoe portion 15 for travel on the ground, the curve thereof corresponding to that of the runner. Integral with the shoe portion 15 are upstanding flanges 16 and 17 that are spaced apart to receive the forward end of the runner, this forward end being curved the same as the forward portion 5 of the runner 1 of the first modification but without the flattened portion. The forward end of the runner is secured frictionally held between the flanges 16 and 17 by a bolt 19 through one flange and threaded into the other. By loosening the bolt the shoe may be moved endwise on the runner shank to elevate or depress the outer end of the shoe.

An extension 18 of the shoe flange 16 carries a bracket 20 secured by cap screws 21 and in which bracket the upper finger 2' is carried.

Additional to the foregoing, means of adjustment is provided for the tail piece 4'. This consists of a plate 22 welded to the tail piece at 23 and shaped at the outer end to provide an inverted cap 24. On the rear end of the tail piece is a flat horizontal portion 25 in which is threaded a screw 26 bearing at its outer end against the under side of the cap 24. In this showing the parts 1', 2', 3', 4', 8', 10', 12' and 13' correspond to the parts 1, 2, 3, 4, 8, 10, 12 and 13 of Figures 1 to 4.

In the use of the pick up, a series of these are forwardly attached to the harvester, making use of the bolt openings in the cutting bar for engagement of the adaptor eye bolts. The adjustable type of pick up should be used on every set at the outer end and replaces the divider boards on the harvester, as this pick up has a heavier load to deal with and untangle as well as dividing the grain. The adjustable pick up may be used throughout where adjustment of the shoe to meet abnormal conditions of heavy or low lying grain or other difficulties is advisable.

While I have herein disclosed a preferred embodiment of my invention, it is obvious that changes in the construction and arrangement of parts would be permissible, and in so far as such changes come within the spirit and scope of the invention as defined in the appended claims.

Having thus particularly described and ascertained the nature of my said invention, what I claim and wish to secure by Letters Patent is:

1. A grain lifter providing a runner for travel over the ground and a rearwardly extending finger carried on the forward end of the runner and further including an upwardly curved forward portion, in which said runner has a part thereof considerably wider than the body of the runner forming a shoe, said part starting at a point rearwardly of the upward curve of the runner and extending to the forward end of the runner to the point of attachment of the finger with the greatest width intermediate thereof and graduated to the ends, a shaft for pivotal suspension of the runner, means for mounting the shaft free to turn transversely on the rear end portion of the runner, threaded bolts having eyes engaging the shaft and including nuts for the bolts, a tail piece having one end integral with the under side of the runner and extending rearwardly parallel therewith, and a cap on the other end of the tail piece, said cap having its upper side inclined forwardly downward.

2. A device as defined in claim 1 and including a resilient plate fixed to the upper side of the tail piece intermediate the length thereof and extending rearwardly, the free end portion of said plate being adapted to form the cap for the tail piece, and a screw carried threaded in the rear end of the tail piece and adapted to bear against the under side of said cap.

References Cited in the file of this patent

UNITED STATES PATENTS

| 368,086 | Grimble | Aug. 9, 1887 |
| 658,133 | Ullmann | Sept. 18, 1900 |
| 723,880 | Koch | Mar. 31, 1903 |
| 1,818,335 | Kenison | Aug. 11, 1931 |
| 2,278,814 | Wiersig | Apr. 7, 1942 |
| 2,298,121 | Grimes | Oct. 6, 1942 |
| 2,552,623 | Dye | May 15, 1951 |
| 2,618,114 | Gaterman, Sr. | Nov. 18, 1952 |

FOREIGN PATENTS

| 518,844 | France | Jan. 12, 1921 |
| 454,362 | Canada | Feb. 1, 1949 |